(12) United States Patent
Bertsche et al.

(10) Patent No.: US 11,485,196 B2
(45) Date of Patent: Nov. 1, 2022

(54) AIR CONDITIONING SYSTEM FOR A MOTOR VEHICLE

(71) Applicant: Mahle International GmbH, Stuttgart (DE)

(72) Inventors: Dirk Bertsche, Stuttgart (DE); Matthias Jung, Stuttgart (DE); Holger Laux, Dietingen (DE); Sascha Lindauer, Schorndorf (DE); Oliver Schultze, Stuttgart (DE)

(73) Assignee: Mahle International GmbH

( * ) Notice: Subject to any disclaimer, the term of this patent is extended or adjusted under 35 U.S.C. 154(b) by 231 days.

(21) Appl. No.: 17/017,668

(22) Filed: Sep. 10, 2020

(65) Prior Publication Data

US 2021/0070144 A1 Mar. 11, 2021

(30) Foreign Application Priority Data

Sep. 11, 2019 (DE) .................. 10 2019 213 860.8

(51) Int. Cl.
*B60H 1/00* (2006.01)

(52) U.S. Cl.
CPC ..... *B60H 1/00899* (2013.01); *B60H 1/00007* (2013.01)

(58) Field of Classification Search
CPC ............ B60H 1/00899; B60H 1/00007; B60H 1/32284; B60H 1/00321; B60H 1/00485;

(Continued)

(56) References Cited

U.S. PATENT DOCUMENTS 4,381,736 A * 5/1983 Hirayama ............... F01P 7/164
123/41.1
4,462,541 A * 7/1984 Hansen .............. G05D 23/1925
251/27

(Continued)

FOREIGN PATENT DOCUMENTS

DE          4238364 A1    5/1994
DE         19625927 A1    1/1998

(Continued)

OTHER PUBLICATIONS

English abstract for DE-102018212188.
English abstract for DE-19937949.

*Primary Examiner* — Ljiljana V. Ciric
(74) *Attorney, Agent, or Firm* — Fishman Stewart PLLC

(57) ABSTRACT

An air-conditioning system for a motor vehicle may include at least two indirect heat exchangers through each of which both water and air is flowable. The water and the air may be fluidically separated from one another such that heat is transferable therebetween. The system may also include a warm water supply, a cold water supply, and at least two temperature-control devices each including a respective indirect heat exchanger of the at least two indirect heat exchangers. The warm and/or cold water supply may be in fluid communication with the at least two indirect heat exchangers. At least one indirect heat exchanger of the at least two indirect heat exchangers may communicate with the warm water supply and the cold water supply via an adjustable and controllable valve device such that a mixing ratio of a mixture of the warm water and the cold water introduced therein is adjustable.

20 Claims, 3 Drawing Sheets

(58) Field of Classification Search
CPC ............ B60H 1/00642; B60H 1/00878; B60H 1/3204; B60H 1/3227
See application file for complete search history.

(56) References Cited

U.S. PATENT DOCUMENTS

| | | | | |
|---|---|---|---|---|
| 4,815,658 | A * | 3/1989 | Hidemitsu | G05D 23/20 237/12.3 A |
| 5,388,423 | A * | 2/1995 | Khelifa | B60H 1/3201 62/480 |
| 5,549,153 | A | 8/1996 | Baruschke et al. | |
| 5,566,881 | A * | 10/1996 | Inoue | B60H 1/00485 237/12.3 B |
| 5,590,832 | A * | 1/1997 | Fiedrich | F24D 19/1033 237/8 R |
| 5,623,990 | A * | 4/1997 | Pirkle | G05D 23/1386 165/294 |
| 5,779,141 | A * | 7/1998 | Okumura | B60H 1/00485 236/78 D |
| 5,809,944 | A * | 9/1998 | Aoki | B60H 1/00878 123/41.02 |
| 5,904,052 | A * | 5/1999 | Inoue | B60H 1/32 62/434 |
| 6,047,770 | A * | 4/2000 | Suzuki | B60H 1/3204 62/526 |
| 10,562,376 | B2 | 2/2020 | Miura et al. | |
| 10,940,740 | B2 * | 3/2021 | Sugimura | B60H 1/321 |
| 2001/0018832 | A1 * | 9/2001 | Matsunaga | B60H 1/034 62/239 |
| 2003/0200948 | A1 * | 10/2003 | Ban | B60H 1/00499 123/142.5 R |
| 2005/0241818 | A1 * | 11/2005 | Yakumaru | B60H 1/00885 62/324.1 |
| 2008/0229768 | A1 * | 9/2008 | Nakamura | B60H 1/00392 62/148 |
| 2008/0289811 | A1 * | 11/2008 | Kariya | F24D 19/1033 165/300 |
| 2011/0214627 | A1 * | 9/2011 | Nishikawa | F01P 7/165 123/41.02 |
| 2012/0017637 | A1 * | 1/2012 | Nakajo | B60H 1/03 62/515 |
| 2012/0018129 | A1 * | 1/2012 | Ushijima | F24D 3/1066 137/340 |
| 2013/0075075 | A1 * | 3/2013 | Tokuda | B60H 1/00278 165/202 |
| 2013/0291577 | A1 * | 11/2013 | Miyakoshi | B60H 1/00907 62/151 |
| 2016/0031288 | A1 * | 2/2016 | Nishikawa | F01P 3/20 165/43 |
| 2016/0068041 | A1 * | 3/2016 | Kim | F01P 7/165 62/115 |
| 2016/0107501 | A1 * | 4/2016 | Johnston | B60H 1/00278 165/41 |
| 2016/0137032 | A1 * | 5/2016 | Kuroda | F25B 25/005 165/104.32 |
| 2016/0159204 | A1 * | 6/2016 | Katoh | B60H 1/32284 62/185 |
| 2016/0209092 | A1 * | 7/2016 | Kuroda | F25B 41/24 |
| 2016/0214461 | A1 * | 7/2016 | Kuroda | B60H 1/00885 |
| 2016/0318499 | A1 * | 11/2016 | Yamanaka | B60L 58/27 |
| 2016/0332505 | A1 * | 11/2016 | Yamanaka | B60H 1/00385 |
| 2017/0021698 | A1 * | 1/2017 | Hatakeyama | F25B 25/005 |
| 2017/0217287 | A1 * | 8/2017 | Kuroda | B60H 1/00921 |
| 2017/0253104 | A1 * | 9/2017 | Amano | B60H 1/00314 |
| 2018/0281557 | A1 * | 10/2018 | Park | B60H 1/2221 |
| 2019/0009642 | A1 * | 1/2019 | Aikawa | F01P 3/20 |
| 2019/0009643 | A1 * | 1/2019 | Yano | B60H 1/025 |
| 2019/0009644 | A1 * | 1/2019 | Aikawa | B60H 1/12 |
| 2019/0009646 | A1 * | 1/2019 | Aikawa | B60H 1/00885 |
| 2019/0030989 | A1 * | 1/2019 | Miura | F25B 29/00 |
| 2019/0030992 | A1 * | 1/2019 | Tada | F25B 30/02 |
| 2019/0063766 | A1 * | 2/2019 | Yin | F24F 11/85 |
| 2019/0160910 | A1 * | 5/2019 | Mano | F16K 5/0471 |
| 2019/0275858 | A1 * | 9/2019 | Seki | B60H 1/00328 |
| 2020/0088090 | A1 * | 3/2020 | Sugihara | B60H 1/32284 |
| 2020/0247215 | A1 * | 8/2020 | Kozasa | B60H 1/3228 |
| 2020/0290431 | A1 * | 9/2020 | Aikawa | B60H 1/3228 |
| 2020/0324611 | A1 * | 10/2020 | Yano | B60H 1/004 |
| 2020/0391572 | A1 * | 12/2020 | Tsukagishi | B60H 1/00428 |
| 2020/0406702 | A1 * | 12/2020 | Hotta | B60H 1/3227 |
| 2020/0406707 | A1 * | 12/2020 | Hotta | B60H 1/00328 |
| 2020/0406717 | A1 * | 12/2020 | Hotta | B60H 1/32331 |
| 2020/0406718 | A1 * | 12/2020 | Hotta | B60H 1/3227 |
| 2020/0406720 | A1 * | 12/2020 | Hotta | B60H 1/32331 |
| 2021/0037677 | A1 * | 2/2021 | LePoudre | G06F 1/20 |
| 2021/0291626 | A1 * | 9/2021 | Makimoto | B60H 1/00278 |
| 2022/0010976 | A1 * | 1/2022 | Heo | F24H 9/20 |

FOREIGN PATENT DOCUMENTS

| | | |
|---|---|---|
| DE | 19937949 A1 | 2/2001 |
| DE | 112016005665 T5 | 8/2018 |
| DE | 102018212188 A1 | 1/2020 |

\* cited by examiner

AIR CONDITIONING SYSTEM FOR A MOTOR VEHICLE

CROSS-REFERENCE TO RELATED APPLICATIONS

This application claims priority to German Patent Application No. DE 10 2019 213 860.8, filed on Sep. 11, 2019, the contents of which is hereby incorporated by reference in its entirety.

TECHNICAL FIELD

The invention relates to an air-conditioning system for a motor vehicle and to a motor vehicle having such an air-conditioning system. The invention, furthermore, relates to a method for operating such an air-conditioning system and for temperature-controlling the vehicle interior of a motor vehicle.

BACKGROUND

For air-conditioning vehicle interiors of motor vehicle, air-conditioning systems with blower, evaporator and heater are often used, which are centrally arranged in a front region of the vehicle interior.

Disadvantageous in such central air-conditioning systems proves to be their high requirement of installation space, which in particular in the front region of the vehicle interior is only available to a limited extent. Apart from this, local air-conditioning of individual zones in the vehicle interior is only possible to a very limited way.

SUMMARY

It is an object of the present invention to create an improved embodiment for an air-conditioning system which requires little installation space yet allows a flexible air-conditioning of different zones of the vehicle interior of a motor vehicle.

This object is solved through the subject of the independent patent claim(s). Preferred embodiments are subject matter of the dependent patent claim(s).

Accordingly, the basic idea of the invention is to construct an air-conditioning system modularly with at least two temperature-control devices, whose heat exchangers are connected to a common cold water supply and to a common warm water supply. By means of a valve device, mixed water of warm water and cold water can be individually provided in the heat exchangers with almost any mixing ratio. Through thermal interaction of this mixed water individually temperature-controlled for each heat exchanger using air conducted through the heat exchanger, which can subsequently be conducted into a certain zone of the vehicle interior, the vehicle interior can be zonally temperature-controlled in a flexible manner. Since the temperature control of the water conducted through the heat exchanger for each temperature-control device or for each heat exchanger by means of a valve device that is relatively simple in construction and can thus be cost-effectively realised in conjunction with a cold and warm water supply that is common to all heat exchangers or temperature control devices, only relatively little installation space is needed for the air-conditioning system. Nevertheless, the air-conditioning system according to the invention introduced here makes possible, because of the at least two existing individual temperature-control devices, to air-condition different zones of the vehicle interior individually.

An air-conditioning system for a motor vehicle according to the invention comprises at least two temperature-control devices, each of which comprises an indirect heat exchanger, through which both water and also—fluidically separated from this—air can flow, so that in the heat exchanger heat from the water can be transferred to the air or vice versa. Furthermore, the air-conditioning system comprises a warm water supply through which warm water can flow. The warm water supply serves for supplying the heat exchanger of the at least two temperature-control devices with warm water and for this purpose fluidically communicates with the respective heat exchanger. Furthermore, the air-conditioning system comprises a cold water supply through which cold water can flow. The cold water supply serves for supplying the heat exchanger of the at least two control devices with cold water and for this purpose fluidically communicates with the respective heat exchanger. At least one heat exchanger of the at least two temperature-control devices communicates, according to the invention, by means of at least one adjustable and controllable valve device both with the warm water supply and also with the cold water supply, namely in such a manner that by means of the valve device a mixing ratio of the water introduced into the associated heat exchanger, consisting of warm water and cold water from the warm water and cold water supply respectively, can be adjusted. In an extreme case, the heat exchanger can also be flowed through only by cold water or only by warm water.

According to the invention, the air-conditioning system comprises a water return, by means of which the water conducted through the heat exchanger of the at least two temperature-control devices can be conducted back into the evaporator or into the condenser. The provision of individual water returns or each heat exchanger can be omitted as a result of which the technical construction of the air-conditioning system is substantially simplified.

According to a preferred embodiment, all indirect heat exchangers of the temperature-control device communicate with the warm and cold water supply by means of an adjustable and controllable valve device. Thus, the proportion of hot water and cold water in the mixed water can be individually adjusted for each temperature-control device.

Practically, the respective valve device is designed as three-way valve preferentially with two valve inlets for connecting to the cold water supply and the warm water supply and to a valve outlet for connecting to the heat exchanger. This measure realises in a simple manner the adjustable fluidic connection of the respective heat exchanger to the cold water and warm water supply that is substantial for the invention. Particularly practically, the valve device or the three-way valve can be designed as proportional valve.

Practically, at least one, preferentially exactly one temperature-control device comprises a heating device, in particular a PTC heating device, for heating the air conducted through the heat exchanger of the temperature-control device. On the one hand, this allows an additional heating of the air conducted through the temperature-control device independently of the warm water supply and on the other hand a so-called "reheat operation", during which the air to be temperature-controlled is initially cooled and dehumidified in the heat exchanger and heated with the help of the electric heating device.

According to a particularly preferred embodiment, all indirect heat exchangers of the temperature-control devices except for a special temperature-control device, whose heat exchangers only communicate with the warm water supply, by means of an adjustable and controllable valve device with the warm water and cold water supply. This special temperature-control device thus requires particularly little installation space so that it can be employed in a front region of the vehicle interior, in which only little installation space is often available.

According to an advantageous further development, the special temperature-control device comprises a direct evaporator which is designed for dehumidifying and cooling the air flowing through the heat exchanger of the special temperature-control device. For heating the air, such a direct heat exchanger, which is part of the special temperature-control device, is fluidically connected merely to the warm water supply, whereas a fluidic connection to the cold water supply can be omitted.

According to a further preferred further development, the air-conditioning system comprises a refrigerant circuit through which a refrigerant can flow. In the refrigerant circuit, a compressor for compressing the refrigerant, a condenser for condensing the refrigerant, preferentially an expansion element for expanding the refrigerant, and at least one evaporator for evaporating the refrigerant are arranged.

In this further development, at least one evaporator is formed as indirect heat exchanger which is arranged in the cold water supply. Thus, cold water for the cold water supply can be generated in the indirect evaporator through heat transfer to the refrigerant. Likewise, at least one condenser is formed as indirect heat exchanger which is arranged in the warm water supply, so that in the indirect condenser through heat discharge from the condensing refrigerant, warm water for the warm water supply can be generated. By means of the refrigerant circuit, both the cold water of the cold water circuit and also the warm water of the warm water circuit can thus be simultaneously temperature-controlled.

According to an advantageous further development, a further additional indirect evaporator is arranged in the refrigerant circuit. This additional indirect evaporator is arranged in a coolant circuit so that in this evaporator, through heat transfer to the refrigerant, the coolant is cooled with which in turn—likewise through heat transfer—components such as power electronics or a battery of the motor vehicle generating waste heat can be cooled. In this further development, a heat exchanger through which ambient air can flow is arranged in the coolant circuit, which functions as low-temperature cooler. The heat exchanger or low-temperature cooler is designed in such a manner that through heat transfer from the coolant to the air the said coolant is cooled.

The water return can be embodied with at least one water return valve by means of which the water conducted through the heat exchangers of the at least two temperature-control devices to the indirect evaporator and to the indirect condenser can be distributed. According to an advantageous further development, two such water return valves are provided. Particularly preferably, a separately controllable water return valve can be provided for each heat exchanger.

In an advantageous embodiment of the air-conditioning system according to the invention, a water return valve in the water return can be omitted.

According to a further advantageous further development, the at least one temperature-control device comprises a blower for driving the air conducted through the heat exchanger. Preferentially, all temperature-control devices of the air-conditioning system each have such a blower. Thus, an improved temperature control of the air conducted through the heat exchanger can be achieved.

Practically, at least one blower is designed as controllable blower. Preferably, this blower is adjustable between at least two performance stages with different blower output. In particular, all blowers of the temperature-control devices are formed as such controllable blowers. In this way, the quantity of air temperature-controlled by means of the heat exchanger can be particularly precisely adjusted.

Practically, the air-conditioning system comprises an open-loop/closed-loop control device for controlling the at least one valve device, preferentially of all valve devices of the air-conditioning system. Particularly preferably, the at least one—in particular controllable—blower can also be controllable by means of the open-loop/closed-loop control device. Particularly preferably, this applies to all blowers of the air-conditioning system.

Practically, at least one blower, preferentially all blowers, can be designed so as to be controllable by means of the open-loop/closed-loop control device, in particular so as to be adjustable between the at least two blower stages.

The invention additionally relates to a motor vehicle, in particular a minibus, having a vehicle interior with an air-conditioning system introduced above for air-conditioning the vehicle interior. The advantages of the air-conditioning system explained above also apply to the motor vehicle according to the invention. Furthermore, the air-conditioning system comprises an open-loop/closed-loop control device for controlling the at least one valve device, preferentially all valve devices, of the air-conditioning system.

According to a preferred embodiment, the heat exchangers of the at least two temperature-control devices fluidically communicate, via different air paths, with air outlets arranged in different positions in the vehicle interior. By means of this measure, local zones of the vehicle interior can be individually temperature-controlled in a flexible manner.

According to a preferred embodiment, the special temperature-control device is arranged in the motor vehicle so that the air temperature-controlled by the heat exchanger of the special temperature-control device is introduced into a front region of the motor vehicle.

The invention, furthermore, relates to a method for operating such an air-conditioning system and for temperature-controlling the motor vehicle interior of a motor vehicle.

In a first aspect of the invention, only warm water from the warm water supply, not however cold water from the cold water supply is conducted according to the method in a first operating state of the air-conditioning system for heating the vehicle interior through the special heat exchanger of the special temperature-control device, so that the air flowing through the heat exchanger is heated by means of the warm water and additionally heated by means of the electric heating device of the special temperature-control device. In a second operating state, only cold water from the cold water supply but no warm water from the warm water supply is conducted through the special heat exchanger for the combined dehumidifying and heating of the vehicle interior, so that the air flowing through the heat exchanger is cooled by means of the cold water and subsequently reheated by means of the electric heating device of the special temperature-control device. In a third operating state, a maturity of cold water or exclusively cold water is conducted out of the cold water supply for cooling the vehicle interior through the special heat exchanger of the special temperature-control device, so that the air flowing through the heat exchanger is cooled by means of the cold water. Optionally, the air can be reheated by means of the electric heating device of the special temperature-control device.

According to a preferred embodiment of the method, a mixture of warm water and cold water is introduced in the first operating state into the heat exchangers of the remaining, non-special temperature-control devices by adjusting/controlling the adjustable and controllable valve devices with the warm water and cold water supply. Alternatively or additionally, a mixture of warm water from the warm water supply and cold water from the cold water supply is introduced in this embodiment in the second operating state or/and in the third operating state into the heat exchangers of the remaining, non-special temperature-control devices by suitably adjusting/controlling the adjustable and controllable valve devices (6b-6e). Alternatively or additionally, exclusively cold water from the cold water supply is introduced into the heat exchangers of the remaining, non-special temperature-control devices in the second or/and third operating state. Alternatively or additionally, the air conducted through the heat exchangers of the non-special temperature-control devices can be heated in the second or/and third operating state by means of the heating device(s).

According to a second aspect of the invention, only warm water from the warm water supply, not however cold water from the cold water supply is conducted through the special heat exchanger of the special temperature-control device in a first operating state of the air-conditioning system for heating the vehicle interior according to the method, so that the air flowing through the heat exchanger is heated by means of the warm water and is additionally heated by means of the electric heating device of the special temperature-control device. In a second operating state for the combined dehumidifying and heating of the air to be dehumidified the air is cooled by means of a direct evaporator and heated with the help of the heat exchanger of the special temperature-control device as in the first operating state. In a third operating state, the air is cooled with the help of the direct evaporator, wherein the heat exchanger of the special temperature-control device is deactivated.

According to a preferred embodiment of the method, a mixture of warm and cold water is introduced in the first operating state into the heat exchangers of the remaining, non-special temperature-control devices by adjusting/controlling the adjustable and controllable valve devices with the warm and cold water supply. Alternatively or additionally, a mixture of warm water from the warm water supply and cold water from the cold water supply is introduced in the second operating state or/and in the third operating state into the heat exchangers of the remaining non-special temperature-control devices by suitably adjusting/controlling the adjustable and controllable valve devices.

According to an advantageous further development of the method, a preconditioning of the vehicle interior takes place in that during the course of the method means of the feeding device the blowers of the respective temperature-control devices and of a blower on the low-temperature cooler, heat is absorbed from the vehicle interior via the heat exchangers and passed on to the outside on the low-temperature cooler.

In a further preferred embodiment of the method, the air-conditioning system can be additionally operated so that the coolant flows into this heat exchanger below the ambient temperature, as a result of which heat from the ambient air can be absorbed. With the help of the refrigerant circuit, this heat is absorbed on the indirect evaporator and with the help of the refrigerant circuit pumped to a higher temperature level, as a result of which warm water for heating the vehicle interior can be provided on the indirect condenser in a particularly energy-efficient manner.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
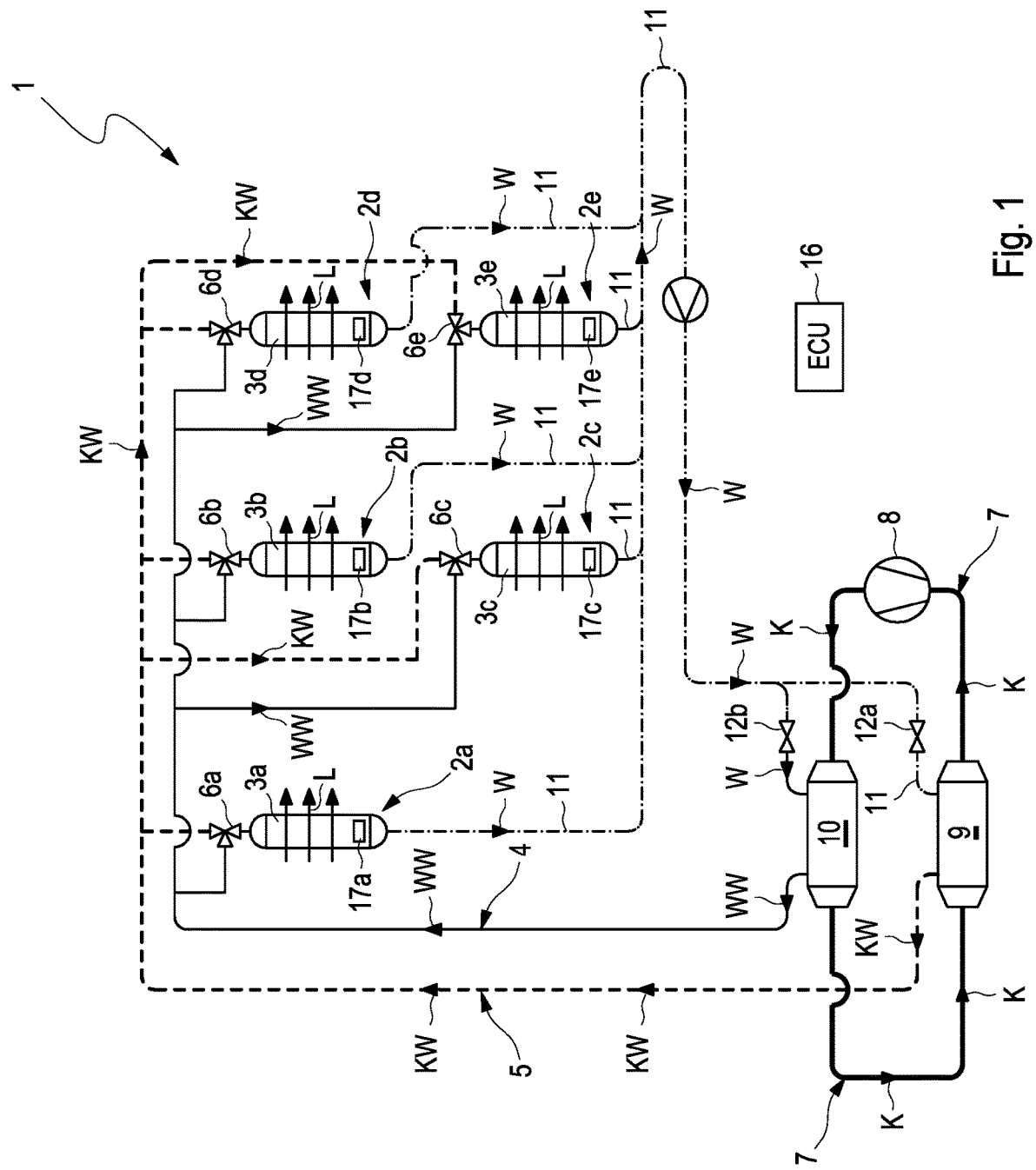
FIG. 1 shows an example of an air-conditioning system according to the invention in a schematic, highly simplified representation.

FIG. 1 illustrates in a schematic representation an example of an air-conditioning system 1 for a motor vehicle according to the invention. The air-conditioning system 1 in the example comprises five temperature-control devices 2a to 2e. In versions of the example, another number of temperature-control devices 2a to 2e can also be provided.

Each temperature-control device 2a to 2e comprises an indirect heat exchanger 3a to 3e, which can be flowed through both by mixed water W from the warm and cold water supply 4, 5 and also—fluidically separated from the same—also by air L, so that in the respective heat exchanger 3a to 3e heat from the mixed water W can be transferred to air L—or vice versa. Having flowed through the respective heat exchanger 3a to 3e, the air L thus temperature-controlled or air-conditioned can be introduced into a certain zone of the vehicle interior of a motor vehicle.

Furthermore, the air-conditioning system 1 comprises a warm water supply 4 through which warm water WW can flow, which for supplying the respective heat exchanger 3a to 3e of the at least two temperature-control device 2a to 2e with warm water WW, fluidically communicates with the same. Furthermore, the air-conditioning system 1 comprises a cold water supply 5 through which cold water KW can flow, which for supplying the respective heat exchanger 3a to 3e of the at least two temperature-control devices 2a to 2e with cold water KW, fluidically communicates with the same.

Likewise, the air-conditioning system 1 comprises a warm water supply 4 through which warm water WW can flow, which for supplying the heat exchangers 3a-3e of the at least two temperature-control devices 2a to 2e with the warm water WW, fluidically communicates with the same. Furthermore, the air-conditioning system 1 comprises a cold water supply 5 through which cold water KW can flow, which for supplying the temperature-control devices 2a to 2e with the cold water KW, fluidically communicates with the same.

Each of the temperature-control devices 2a to 2e can comprise an adjustable and controllable valve device 6a to 6e. However, for the individual temperature control of at least two zones of a vehicle interior, at least two valve devices 6a, 6b are needed, so that with the help of PTC heating devices which are not shown in FIG. 1, the desired different temperature levels can be realised. Apart from this, each of the heat exchangers 3a to 3e fluidically communicates with the warm and cold water supply 4, 5, so that by means of the respective valve device 6a to 6e a mixing ratio of the warm water WW, KW introduced into the heat exchangers 3a to 3e can be adjusted. For this purpose, the valve devices 6a to 6e can each be formed as three-way valve with a valve outlet and with a first and second valve inlet. In order to be able to precisely adjust the mixing ratio, the valve devices 6a to 6e can each be additionally formed as proportional valves. For each of the heat exchangers 3a to 3e, a separately controllable valve device 6a to 6e can be provided. For controlling the valve devices 6a to 6e, the air-conditioning system 1 comprises an open-loop/closed-loop control device 16.

Each temperature-control device 2a to 2e comprises a blower 17a to 17e for feeding or driving the air L conducted through the heat exchanger 3a to 3e. The respective blowers 17a to 17e can be arranged in the associated temperature-control devices 2a to 2e or outside these (not shown). Each individual blower 17a to 17e is formed as blower that is controllable by means of the open-loop/closed-loop control device 16 and adjustable at least between two output stages with different blower output. The air L conducted through the respective heat exchanger 3a to 3e is temperature-controlled through heat exchange from the mixture of warm water WW and cold water KW conducted through the same heat exchanger 3a to 3e and subsequently introduced via a separately formed air path—typically realised as air duct—into the vehicle interior of the motor vehicle.

For providing warm water WW to the water supply 4 and cold water KW to the cold water supply 5, the air-conditioning system 1 comprises a refrigerant circuit 7 through which a refrigerant K can flow. Possible refrigerants are fluids known to the person skilled in the art under the designations R134a, R1234yf, or R744. In the refrigerant circuit 7, a compressor 8 for compressing the refrigerant K, a condenser 10 for condensing the refrigerant K, an expansion element for expanding the refrigerant K and an evaporator 9 for evaporating the refrigerant K are arranged.

As illustrated by FIG. 1, the air-conditioning system 1 comprises a water return 11, by means of which the water mixture of warm water WW and cold water KW conducted through the heat exchangers 3a to 3e of the temperature-control devices 2a to 2e is conducted back into the evaporator 9 or into the condenser 10.

Both the evaporator 9 and also the condenser 10 are flowed through during the operation—fluidically separated from the refrigerant K—by mixed water W from the water return 11. For this purpose, the evaporator 9 is designed as indirect heat exchanger which is thermally connected to the cold water supply 5. Thus, the cold water KW for the cold water supply 5 can be generated in the evaporator 9 through heat transfer from the water W to the refrigerant K. The condenser 10 is also designed as indirect heat exchanger which is thermally connected to the warm water supply 4. Thus, warm water WW for the warm water supply 4 can be generated in the condenser 10 through extraction of heat from the refrigerant K.

In the water return 11, two water return valves 12a, 12b are arranged. A first water return valve 12a is arranged upstream of the evaporator 9. A second water return valve 12b is arranged upstream of the condenser 10. By means of two water return valves 12a, 12b, the mixed water W conducted through the heat exchangers 3a-3e of the temperature-control devices 2a-2e and subsequently through the water return 11 can be distributed over the evaporator 9 and over the condenser 10, where it can be again cooled and heated respectively.

The air-conditioning system 1 introduced above can be employed in a motor vehicle, in particular in a minibus, in order to air-condition the vehicle interior of the same. Practically, the five heat exchangers 3a-3e of the five temperature-control devices 2a-2e communicate fluidically via different air paths with air outlets arranged in five different positions in the vehicle interior. This allows a zonal air-conditioning of the vehicle interior with five different zones.

Figure 2:
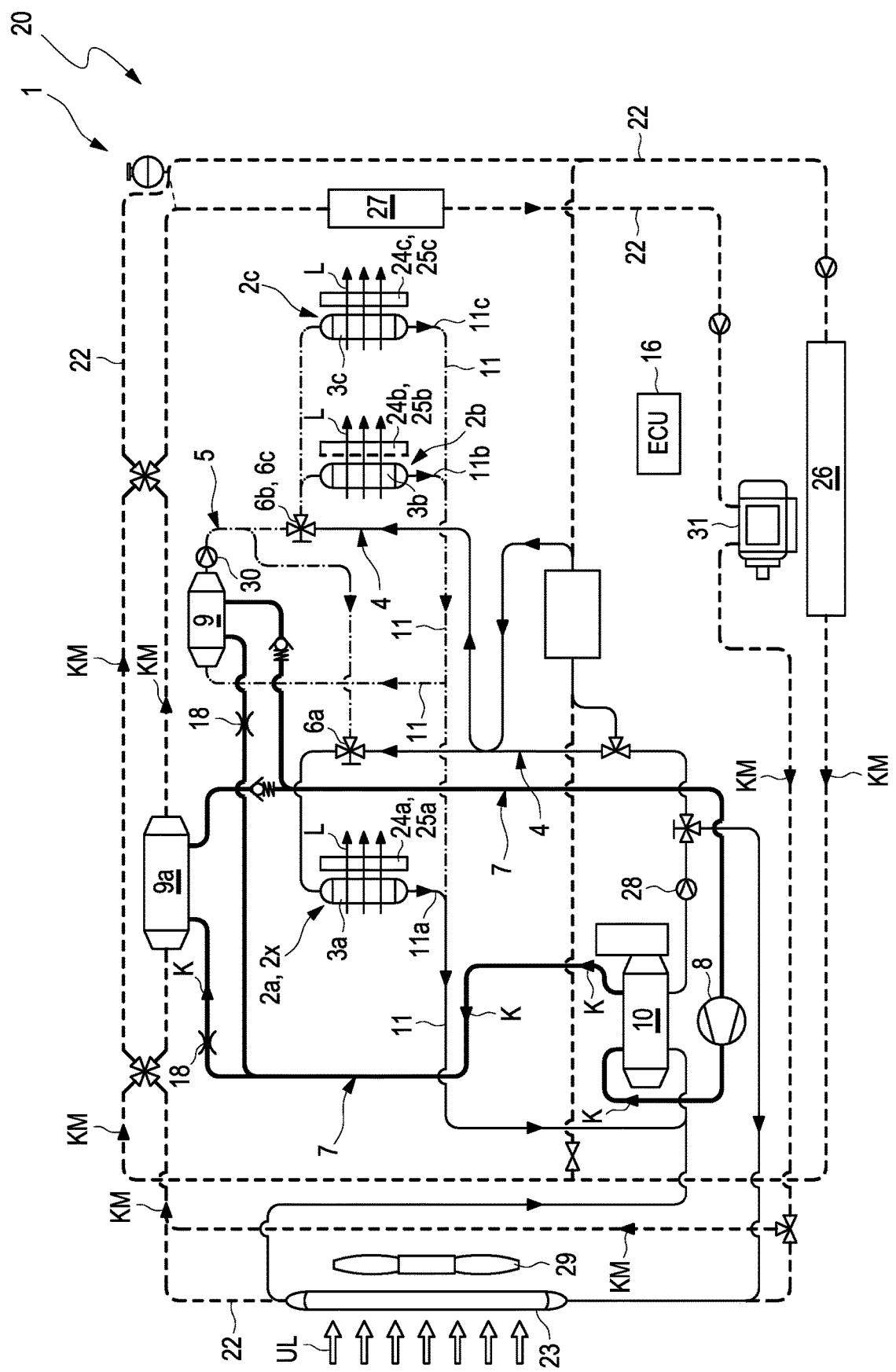
FIG. 2 shows a first application example of the air-conditioning system of FIG. 1 in a schematic representation.

FIG. 2 illustrates a second application example of the air-conditioning system 1 of FIG. 1 in a motor vehicle 20. In the application example of FIG. 2, all indirect heat exchangers 3a-3c of the temperature-control devices 2a-2c communicate by means of an adjustable and controllable valve device 6a, 6b, c both with the warm water supply 4 and also with the cold water supply 5.

Depending on the mode of operation, the heat exchangers 3a-3c in the temperature-control devices 2a-2c are operated differently.

In a first operating state of the air-conditioning system 1, the same is operated so that the vehicle interior of the motor vehicle is heated. For this purpose, only warm water WW is conducted through the heat exchanger 3a in the temperature-control device 2a for this purpose in that the valve device 6a correspondingly does not realise any cold water flow-through. Accordingly, the warm water WW is returned, downstream of the heat exchanger 3a, via the water return 11c, to the indirect condenser 10. Thus, the air L is initially heated on the heat exchanger 3a through heat transfer from the warm water WW to the air L and can subsequently be further heated through the air-side heating device 24a.

The heat exchangers 3b, 3c by way of the valve device 6b, c can be supplied both with warm water WW and also with cold water KW. The mixed water downstream of the heat exchangers 3b and 3c is returned via the water return 11 to the indirect evaporator 9 and the indirect condenser 10. In the process, the warm water quantity, which was returned to the heat exchangers 3b and 3c with the help of the feeding device 28 and the valve device 6b, c were returned via the water return 11c to the indirect condenser 10. The cold water quantity, which was fed to the heat exchangers 3b, 3c with the help of the feeding device 30 and the valve device 6b, c, is returned via the water return 11b, 11c to the indirect evaporator 9. Thus, the air L is initially heated in the heat exchanger 3b, 3c but can subsequently be further heated through the air-side heating device 24b and 24c.

In a second operating state of the air-conditioning system 1, the so-called "reheat" mode, air L is cooled and dehumidified through the heat exchanger 3a and subsequently heated by means of the heating device 24a and the PTC heating device 25a respectively.

Through the heat exchanger 3a in the temperature-control device 2a, only cold water KW is conducted in that the valve device 6a accordingly does not realise any warm water flow-through. Accordingly, the cold water KW is returned to the indirect evaporator 9 downstream of the heat exchanger 3a via the water return 11b and 11a. Thus, the air L is cooled on the heat exchanger 3a through heat transfer from the air L to the cold water KW and subsequently heated by the air-side heating device 24a.

In this operating mode, the heat exchangers 3b and 3c are only supplied with cold water KW via the valve device 6b, c. The cold water KW downstream of the heat exchangers 3b and 3c is returned via the water return 11b, 11c to the indirect evaporator 9. Thus the air in the heat exchanger 3b and 3c is cooled and can be subsequently reheated through the air-side heating device 24b and 24c.

Alternatively to this, the mixing ratio of warm water and cold water WW, KW for the temperature-control devices 2b and 2c can be adjusted through the valve device 6b, c that is jointly available for the two temperature-control devices 2b and 2c. An additionally desired different air blowout temperature on the temperature-control devices 2a-2c is then achieved in that with the help of the heating devices 24a-24c reheating is carried out at the place where an elevated air blowout temperature is desired. The lowest air blowout temperature is energy-efficiently provided by the air-conditioning system and the warm and cold water WW, KW distributed over the heat exchangers 3a-3c through the adjustment of the relevant valve position of the valve device 6a, 6b, c or the feeding devices 28, 30.

In a third operating state of the air-conditioning system 1, the same is operated so that the vehicle interior of the motor vehicle is cooled. For the case that that zone of the vehicle interior, which is temperature-controlled by means of the temperature-control device 2a, compared to zones, which are temperature-controlled by the temperature-control devices 2b and 2c, is to be furnished with a higher temperature, the temperature-control devices 2b, 2c are exclusively supplied with cold water KW. With the help of the air-side heating devices 24b, 24c, air L can be individually re-temperature-controlled for each zone in the vehicle cab. The operation of the temperature-control devices 2b and 2c takes place as in the operating mode "reheat" explained above. Here, the temperature-control device 2a can be supplied with warm and cold water WW, KW. Through the valve device 2a, mostly cold water KW is fed to the heat exchanger 3a depending on the desired air blowout temperature, so that the air L is cooled. The warm water quantity, which was fed to the heat exchanger 3a with the help of the feeding device 28 and the valve device 6a is returned via the water return 11, 11a to the indirect condenser 10. The cold water quantity, which was fed to the heat exchanger 3a with the help of the feeding device 30 and of the valve device 6a is returned via the water return 11, 11a to the indirect evaporator 9. For the case that that region of the vehicle interior, which is supplied with the temperature-control device 2a, compared to the zones, which are supplied to the temperature-control devices 2b and 2c, are to be furnished with a lower temperature, the temperature-control device 2a is accordingly supplied exclusively with cold water KW. Accordingly, the temperature-control devices 2b and 2c can be supplied with cold and warm water KW, WW. The procedure for the water return corresponds to the first operating state for heating the vehicle interior.

In an alternative operating mode for cooling the vehicle interior, the heat exchanger 3a in the temperature-control device 2a can be flowed through with cold water in addition to the evaporator operation, as a result of which the air can be cooled further. However, in this special embodiment, the heat exchangers 3b and 3c in the temperature-control devices 2b and 2c can then likewise only be operated with cold water. This embodiment is particularly recommended for elevated cooling demands in contrast with the first the first-mentioned embodiment, which is employed preferably with moderate cooling requirements.

According to the example of FIG. 2 a further additional evaporator 9a is arranged in the refrigerant circuit 7. In the refrigerant circuit 7, a compressor 8 for compressing the refrigerant K, a condenser 10 for condensing the refrigerant K, to expansion elements 18 for expanding the refrigerant K and to evaporators 9 and 9a for evaporating the refrigerant K are arranged.

The additional evaporator 9a is also arranged fluidically separated from the refrigerant circuit 7 in a coolant circuit 22 through which a coolant KM can flow, so that in the additional evaporator 9a by way of heat extraction from the coolant KM, the refrigerant K is evaporated and the coolant KM thereby cooled. This evaporator is embodied as indirect evaporator. A possible coolant is for example a mixture of water and Glysantin at 50/50% by volume (at 20° C.).

In the coolant circuit 22 a low-temperature cooler 23 that can be flowed through by ambient air UL is arranged—fluidically separated from the coolant. The low-temperature cooler 23 is designed in such a manner that both by way of heat transfer from the coolant KM to the ambient air UL the coolant KM is cooled and also the possibility exists that the coolant KM is heated by way of heat transfer from the ambient air UL to the coolant KM. In the coolant circuit 22, a battery 26 and power electronics 27 are arranged, which in turn can both be cooled by way of heat transfer to the coolant KM circulating in the coolant circuit 22.

With the help of the air-conditioning system 1 it is additionally possible to utilise the waste heat incurred on the battery 26, on the power electronics 27 and on an electric drive 31 for driving the motor vehicle for heating the vehicle interior. To this end, the coolant, which absorbs the waste heat is conducted via the indirect evaporator 9a where the waste heat is transferred to the refrigerant. With the help of the refrigerant circuit, the waste heat is pumped up to a higher temperature level as a result of which warm water WW for heating the vehicle interior can be provided on the indirect condenser 10.

The warm water supply 4 is likewise fluidically connected to the low-temperature cooler 23, via which excess heat can thus be given off to the ambient air UL in the known manner. By way of the low-temperature cooler 23 and the heat exchangers 3a, 3b, 3c, a pre-air-conditioning of the vehicle interior can particularly advantageously take place. For this purpose, the warm water WW can be conducted through the heat exchangers 3a, 3b, 3c by means of a feeding device 28 that is present in the warm water supply 4 with deactivated refrigerant circuit 7, where in the case of a particularly greatly heated vehicle interior—in particular in the case of a temperature level of more than 40° C.—heat is absorbed and thus removed from the vehicle interior. On the low-temperature cooler 23, the heat output takes place from the coolant KM to the ambient air UL. Thus, a pre-air-conditioning of the vehicle interior at inside temperatures which—in particular through solar load—are significantly above the ambient temperature, is particularly energy-efficiently possible since only the feeding device 28, the HVAC blower and a blower 29 provided on the low-temperature cooler 23 have to be put into operation. Compared with the solutions known from the prior art, air, via an air intake, can be used for pre-conditioning the vehicle interior, which however is drawn in below the windscreen, in particular near the engine bonnet of the motor vehicle, where because of solar load a significantly elevated temperature of more than 50° C. can be present.

Practically, the temperature-control device 2a is arranged in the motor vehicle 20 so that the air that is temperature-controlled by the heat exchanger 3a and the PTC heating device is introduced into a front region of the motor vehicle. The temperature-control device 2b and 2c by contrast are preferably arranged in the motor vehicle 20 so that the air temperature-controlled by these is introduced into a rear region—or at least into a region that is distinct from the front region—of the motor vehicle 20. Through the air-conditioning system shown in FIG. 2, in particular through the cold water supply 5 and warm water supply 4, the valve device 6a and through the water return 11 and 11a, 11b, 11c respectively and through the described mode of operation for realising different operating modes (heating, reheating, cooling) a particularly cost-effective (few coolant lines) embodiment is possible.

Figure 3:
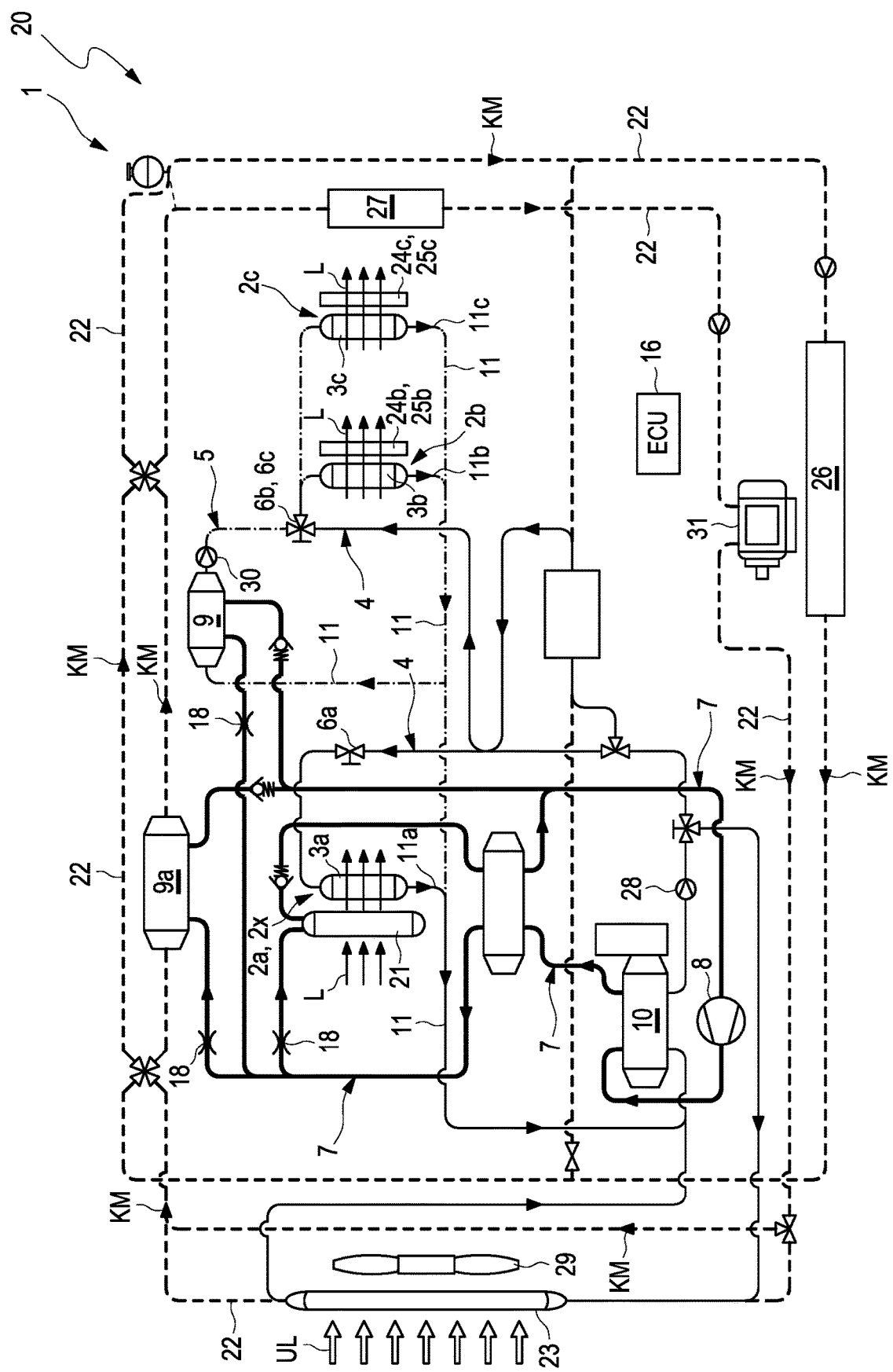
FIG. 3 shows a second application example of the air-conditioning system of FIG. 1 in a schematic representation.

FIG. 3 shows a second application example of the air-conditioning system 1 of FIG. 1. In the example of FIG. 3, all indirect heat exchangers 3b, 3c of the temperature-control devices 2b, 2c, except for a single temperature-control device 2a—which in the following is referred to as "special temperature-control device 2x"—communicate by means of an adjustable and controllable valve device 6b, c both with the warm water supply 4 and also with the cold water supply 5. The special temperature-control device 2a, 2x by contrast comprises a heat exchanger 3a which only communicates with the warm water supply 4, but not with the cold water supply 5.

As is evident from FIG. 3, the special temperature-control device 2x comprises an additional evaporator 21, which is designed for dehumidifying and cooling the air L flowing through the heat exchanger 3a of the special temperature-control device 2x. The temperature-control devices 2b and 2c remain unchanged. Depending on the operating mode, the heat exchangers 3b, 3c in the temperature-control devices 2b, 2c are operated differently.

In a first operating state of the air-conditioning system 1, the same is operated so that the vehicle interior of the motor vehicle is heated. The heating of the air takes place in the temperature-control device 2x with the help of the heat exchanger 3a, which in this embodiment of the air-conditioning system 1 is merely connected to the warm water supply 4 via the valve device 6a. The valve device 6a accordingly is now preferably embodied as two-way valve, no longer as three-way valve. Thus, only warm water WW is conducted through the heat exchanger 3a in the temperature-control device 2x. Accordingly, the warm water WW downstream of the heat exchanger 3a is returned via the water return 11 into the indirect condenser 10. For this reason, the air L is heated on the heat exchanger 3a through heat transfer from the warm water WW to the air L and can subsequently be further heated through the air-side heating device 24a. The indirect evaporator 9 is not operated, i.e. the associated expansion valve 18 is closed. The operating mode of the temperature-control devices 3b and 3c corresponds to the first application example according to FIG. 3 in the first operating state.

In a second operating state of the air-conditioning system 1, the so-called "reheat" mode, the air in the temperature-control device 2x is cooled with the help of the direct evaporator 21 in that the heat from the air is transferred to the refrigerant K. Thus, the air L that is conducted, fluidically separated from the refrigerant K, through the additional evaporator 21 formed as heat exchanger can be cooled and dehumidified through heat transfer from the air to the refrigerant K. With the help of the heat exchanger 3a, which as in the first operating state is flowed through by warm water, the air is heated. As in the first operating state, the water return likewise takes place in the "heating" operating mode.

In the temperature-control devices 2b and 2c, the heat exchangers 2b and 2c are supplied with cold and warm water KW, WW. Depending on the desired dehumidification output, the cold and warm water quantity is adjusted via the feeding devices 28 and 30 and the valve devices 6b, c, wherein in practice mostly cold water is required. The mixed water downstream of the heat exchangers 3b and 3c is returned via the water return 11 to the indirect evaporator 9 and the indirect condenser 10. In the process, the warm water quantity, which was fed to the heat exchangers 3b and 3c with the help of the feeding device 28 and the valve device 6b, 6c is returned via the water return 11c to the indirect condenser. The cold water quantity, which was returned to the heat exchangers 3b and 3c with the help of the feeding device 30 and the valve device 6b, c, is returned to the indirect evaporator via the water return 11b, 11c. The air is thus cooled on the heat exchanger 3b and 3c and can subsequently be further heated by the air-side heating device 24b and 24c.

In the third operating state of the air-conditioning system 1, the same is operated so that the vehicle interior of the motor vehicle is cooled. In the temperature-control device 2x, the air L is cooled for this purpose with the help of the direct evaporator 21, in that the heat from the air is transferred to the refrigerant K. The heat exchanger 3a is not flowed through by water since the valve device 6a is closed. In the temperature-control devices 2b and 2c, the heat exchangers 2b and 2c are supplied with cold and warm water KW, WW. The cold and warm water quantity is adjusted depending on the desired cooling output via the feeding devices 28 and 30 and the valve device 6b, c, wherein mostly cold water is required. The mixed water downstream of the heat exchangers 3b and 3c is returned via the water return 11 to the indirect evaporator 9 and the indirect condenser 10. In the process, the warm water quantity, which was returned to the heat exchangers 3b and 3c with the help of the feeding device 28 and the valve device 6b, c, is returned to the indirect condenser 10 via the water return 11c. The cold water quantity, which was fed to the heat exchangers 3b and 3c with the help of the feeding device 30 and the valve device 6b, c, is returned into the indirect evaporator 9 via the water return 11b, 11c. Thus, the air in the heat exchangers 3b and 3c is cooled and can be subsequently further heater through the air-side heating device 24b and 24c.

An additionally desired different air blowout temperature on the temperature-control devices 2b, 2c is achieved in that with the help of the heating devices 24b, 24c reheating is carried out in the place where an elevated air blowout temperature is desired. The low air blowout temperature is energy-efficiently achieved by adjusting the corresponding valve position of the valve device 6b, c.

In the refrigerant circuit 7, a compressor 8 for compressing the refrigerant K, a condenser 10 for condensing the refrigerant K, three expansion elements 18 for expanding the refrigerant K and three evaporators 9, 9a and 21 for evaporating the refrigerant K are arranged.

With this version, the additional evaporator 9a is also arranged fluidically separated from the refrigerant circuit 7 in a coolant circuit 22 through which a coolant KM can flow, so that in the additional evaporator 9a, by way of heat extraction from the coolant KM, the refrigerant K is evaporated and the coolant KM thereby cooled. This evaporator is embodied as indirect evaporator.

In the coolant circuit 22, a low-temperature cooler 23 that is fluidically separated from the coolant and can be flowed through by ambient air UL is arranged. The low-temperature cooler 23 is designed in such a manner that both by way of heat transfer from the coolant KM to the ambient air UL the coolant KM is cooled and there is also the possibility that the coolant KM is heated through heat transfer from the ambient air UL to the coolant KM. In the coolant circuit 22, a battery 26 and power electronics 27 are arranged, which both in turn can be cooled through heat transfer to the coolant KM circulating in the coolant circuit 22.

With the help of the air-conditioning system it is additionally possible to utilise the waste heat incurred on the battery and on the power electronics and also on the electric drive 31 of the motor vehicle for heating the vehicle cab. For this purpose, the coolant, which absorbs the waste heat, is conducted via the indirect evaporator 9a where the waste heat is transferred to the refrigerant. With the help of the refrigerant circuit, the waste heat is pumped up to a higher temperature level as a result of which warm water for heating the vehicle cab can be provided at the indirect condenser.

The warm water supply 4 is likewise fluidically connected to the low-temperature cooler 23, via which excess heat can thus be given off to the ambient air UL in the known manner. By way of the low-temperature cooler 23 and the heat exchangers 3a, 3b, 3c, a pre-air-conditioning of the motor vehicle interior can particularly advantageously take place. To this end, the warm water WW can be conducted through the heat exchangers 3a, 3b, 3c by means of a feeding device 13 that is present in the warm water supply 4, with the refrigerant circuit 7 deactivated, where in the case of a particularly greatly heated vehicle interior in particular at a temperature of more than 40° C.—heat is absorbed and thus discharged from the vehicle interior. The heat output from the coolant KM to the ambient air UL takes place on the low-temperature cooler 23. Thus, a pre-air-conditioning of the vehicle interior at inside room temperatures, which—in particular through solar load—are significantly above the ambient temperature, is particularly energy-efficiently possible since only the feeding device 28, the HVAC blower and a blower 29 provided on the low-temperature cooler 32 have to be put into operation. In comparison with solutions known from the prior art, air can be used by way of an air intake for pre-conditioning the vehicle interior, which however is drawn in below the windscreen, in particular near the engine hood, where because of solar load a significantly elevated temperature of more than 50° C. can be present.

Practically, the special temperature-control device is arranged in the motor vehicle 20 so that the air that is temperature-controlled by the heat exchanger 3 of the special temperature-control device 2x is introduced into a front region of the motor vehicle. The temperature-control devices 2b and 2c by contrast are preferably arranged in the motor vehicle 20 so that the air temperature-controlled by these is introduced in a rear region—or at least in a region that is distinct from the front region—of the motor vehicle 20.

The invention claimed is:

1. An air-conditioning system for a motor vehicle, comprising:
    at least two indirect heat exchangers through each of which both water and air is flowable, the water and the air fluidically separated from one another such that in each of the at least two indirect heat exchangers heat is transferable between the water and the air;
    at least two temperature-control devices each including a respective indirect heat exchanger of the at least two indirect heat exchangers;
    a warm water supply through which warm water is flowable, the warm water supply in fluid communication with the at least two indirect heat exchangers for supplying the at least two indirect heat exchangers with the warm water;
    a cold water supply through which cold water is flowable, the cold water supply in fluid communication with the at least two indirect heat exchangers for supplying the at least two indirect heat exchangers with the cold water; and
    wherein at least one indirect heat exchanger of the at least two indirect heat exchangers communicates with the warm water supply and the cold water supply via an adjustable and controllable valve device such that, via the valve device, a mixing ratio of a mixture of the warm water and the cold water introduced into the at least one indirect heat exchanger is adjustable.

2. The air-conditioning system according to claim 1, wherein each of the at least two indirect heat exchangers fluidically communicate with the warm water supply and the cold water supply via a respective adjustable and controllable valve device.

3. The air-conditioning system according to claim 1, wherein at least one temperature-control device of the at least two temperature-control devices includes a heating device for heating the air conducted through the respective indirect heat exchanger.

4. The air-conditioning system according to claim 1, wherein:
    at least one temperature-control device of the at least two temperature-control devices is structured as a special temperature-control device; and
    the respective indirect heat exchanger of the special temperature-control device fluidically communicates only with the warm water supply.

5. The air-conditioning system according to claim 4, wherein each of the at least two indirect heat exchangers, except for the respective indirect heat exchanger of the special temperature-control device, fluidically communicate with the warm water supply and the cold water supply via the adjustable and controllable valve device.

6. The air-conditioning system according to claim 5, wherein the special temperature-control device includes an evaporator configured to dehumidify and cool the air flowing through the respective indirect heat exchanger of the special temperature-control device.

7. The air-conditioning system according to claim 1, further comprising a refrigerant circuit through which a refrigerant is flowable, a compressor for compressing the refrigerant, a condenser for condensing the refrigerant, and an evaporator for evaporating the refrigerant, wherein:
    the compressor, the condenser, and the evaporator are arranged in the refrigerant circuit;
    the evaporator is configured as an indirect heat exchanger which is arranged, fluidically separated from the refrigerant circuit, in the cold water supply such that in the evaporator, through heat transfer to the refrigerant, the cold water for the cold water supply is generatable, and
    the condenser is configured as an indirect heat exchanger which is arranged, fluidically separated from the refrigerant circuit, in the warm water supply such that in the condenser the warm water for the warm water supply is generatable through heat extraction from the refrigerant.

8. The air-conditioning system according to claim 7, wherein:
    an additional evaporator is arranged in the refrigerant circuit; and
    the additional evaporator is arranged, fluidically separated from the refrigerant circuit, in a coolant circuit such that in the additional evaporator, through heat extraction from the refrigerant to a coolant flowable through the coolant circuit, the refrigerant is coolable.

9. The air-conditioning system according to claim 7, further comprising a water return including at least one water return valve via which the water conducted through the at least two indirect heat exchangers is distributable over the evaporator and over the condenser.

10. The air-conditioning system according to claim 1, further comprising a separately controllable valve device for each of the at least two indirect heat exchangers.

11. The air-conditioning system according to claim 1, wherein the valve device is structured as a three-way valve.

12. The air-conditioning system according to claim 1, wherein the valve device is structured as a proportional valve.

13. A motor vehicle, comprising:
a vehicle interior,
an air-conditioning system for air-conditioning the vehicle interior;
an open-loop/closed-loop control device;
the air-conditioning system including:
at least two indirect heat exchangers through each of which both water and air is flowable, the water and the air fluidically separated from one another such that in each of the at least two indirect heat exchangers heat is transferable between the water and the air;
at least two temperature-control devices each including a respective indirect heat exchanger of the at least two indirect heat exchangers;
a warm water supply through which warm water is flowable, the warm water supply in fluid communication with the at least two indirect heat exchangers for supplying the at least two indirect heat exchangers with the warm water;
a cold water supply through which cold water is flowable, the cold water supply in fluid communication with the at least two indirect heat exchangers for supplying the at least two indirect heat exchangers with the cold water;
wherein at least one indirect heat exchanger of the at least two indirect heat exchangers communicates with the warm water supply and the cold water supply via an adjustable and controllable valve device such that, via the valve device, a mixing ratio of a mixture of the warm water and the cold water introduced into the at least one indirect heat exchanger is adjustable; and
wherein the control device is configured to control the valve device of the air-conditioning system.

14. The motor vehicle according to claim 13, wherein the at least two indirect heat exchangers fluidically communicate, via different air paths of a plurality of air paths, with a plurality of air outlets arranged in different positions in the vehicle interior.

15. The motor vehicle according to claim 13, wherein:
at least one temperature-control device of the at least two temperature-control devices is structured as a special temperature-control device;
the respective indirect heat exchanger of the special temperature-control device fluidically communicates only with the warm water supply; and
the special temperature-control device is arranged such that the air that is temperature-controlled in the respective heat exchanger of the special temperature-control device is introduced into a front region of the motor vehicle.

16. A method for operating an air-conditioning system according to claim 4 for temperature-controlling a vehicle interior of a motor vehicle, the method comprising:
in a first operating state for heating the vehicle interior, conducting exclusively the warm water from the warm water supply through the respective indirect heat exchanger of the special temperature-control device such that the air flowing through the respective indirect heat exchanger of the special temperature-control device is heated via the warm water and an electric heating device of the special temperature-control device;
in a second operating state for combined dehumidifying and heating the vehicle interior, conducting exclusively the cold water from the cold water supply through the respective indirect heat exchanger of the special temperature-control device such that the air flowing through the respective indirect heat exchanger of the special temperature-control device is cooled and dehumidified via the cold water and subsequently reheated via the electric heating device of the special temperature-control device; and
in a third operating state for cooling the vehicle interior, conducting at least one of i) mostly and ii) exclusively the cold water from the cold water supply through the respective indirect heat exchanger of the special temperature-control device such that the air flowing through the respective indirect heat exchanger of the special temperature-control device is cooled via the cold water.

17. The method according to claim 16, further comprising at least one of:
in the first operating state, introducing the mixture of the warm water and the cold water into the respective indirect heat exchangers of the at least two temperature-control devices by that are not structured as a special temperature-control device via adjusting/controlling the valve devices;
in at least one of the second operating state and the third operating state, introducing the mixture of the warm water and the cold water into the respective indirect heat exchangers of the at least two temperature-control devices that are not structured as a special temperature-control device via suitable adjusting/controlling of the valve device;
in at least one of the second operating state and the third operating state, introducing exclusively the cold water into the respective indirect heat exchanger of the at least two temperature-control devices that are not structured as a special temperature-control device; and
in at least one of the second operating state and the third operating state, heating the air conducted through the respective indirect heat exchangers of the at least two temperature-control devices that are not structured as a special temperature-control device via the heating device.

18. The method according to claim 16, further comprising preconditioning the vehicle interior via a feeding device, the at least two temperature-control devices and a blower such that heat from the vehicle interior is absorbed via the at least two indirect heat exchangers and is discharged from the vehicle interior at a low-temperature cooler.

19. A method for operating an air-conditioning system according to claim 4 for temperature-controlling a vehicle interior of a motor vehicle, the method comprising:
in a first operating state for heating the vehicle interior, conducting only the warm water through the respective indirect heat exchanger of the special temperature-control device such that the air flowing through the respective indirect heat exchanger of the special temperature-control device is heated via the warm water and an electric heating device of the special temperature-control device;

in a second operating state for combined dehumidifying and heating of the air, cooling the air with help from a direct evaporator and heating the air with help from the respective indirect heat exchanger of the special temperature-control device as in the first operating state; and in a third operating state, cooling the air with the help of the direct evaporator while the respective indirect heat exchanger of the special temperature-control device is deactivated.

20. The method according to claim 19, further comprising at least one of:

in the first operating state, introducing the mixture of the warm water and the cold water via adjusting/controlling the valve devices; and in at least one of the second operating state and the third operating state, introducing the mixture of the warm water and the cold water into the respective indirect heat exchangers of the at least two temperature-control devices that are not structured as a special temperature-control device via suitably adjusting/controlling the valve device.

* * * * *